US012785842B2

(12) United States Patent
Le Gall et al.

(10) Patent No.: US 12,785,842 B2
(45) Date of Patent: Nov. 3, 2026

(54) DEVICE FOR CONNECTING, BY REALLOCATION OF TRANSMISSION CHANNELS, TO AN ON-BOARD PASSIVE FIBRE MULTIPLEXED COMMUNICATION NETWORK FOR AN AIRCRAFT

(71) Applicants: SAFRAN ELECTRICAL & POWER, Blagnac Cedex (FR); CAILABS, Rennes (FR)

(72) Inventors: Sébastien Le Gall, Moissy-Cramayel (FR); Christophe Berterottiere, Moissy-Cramayel (FR); Bertrand Denolle, Rennes (FR)

(73) Assignees: SAFRAN ELECTRICAL & POWER, Blagnac (FR); CAILABS, Rennes (FR)

( * ) Notice: Subject to any disclaimer, the term of this patent is extended or adjusted under 35 U.S.C. 154(b) by 344 days.

(21) Appl. No.: 18/707,134

(22) PCT Filed: Nov. 4, 2022

(86) PCT No.: PCT/FR2022/052080

§ 371 (c)(1),
(2) Date: May 2, 2024

(87) PCT Pub. No.: WO2023/079248

PCT Pub. Date: May 11, 2023

(65) Prior Publication Data

US 2025/0012976 A1 Jan. 9, 2025

(30) Foreign Application Priority Data

Nov. 5, 2021 (FR) ....................................... 2111777

(51) Int. Cl.

*H04J 14/04* (2006.01)
*G02B 6/28* (2006.01)
*H04B 10/2581* (2013.01)

(52) U.S. Cl.

CPC ............ *H04J 14/04* (2013.01); *G02B 6/2817* (2013.01); *H04B 10/2581* (2013.01)

(58) Field of Classification Search

CPC .... G02B 6/2817; H04B 10/2581; H04J 14/04
See application file for complete search history.

(56) References Cited

U.S. PATENT DOCUMENTS 8,977,121 B2 3/2015 Djordjevic et al.
2007/0237452 A1 10/2007 Truong
(Continued)

FOREIGN PATENT DOCUMENTS

EP 2903185 A1 8/2015
WO 2010151484 A1 12/2010

OTHER PUBLICATIONS

French Search Report for French Application No. 2111777, issued Jun. 23, 2022 (14 pages).
(Continued)

*Primary Examiner* — Michael P Mooney
(74) *Attorney, Agent, or Firm* — Bookoff McAndrews, PLLC

(57) ABSTRACT

A device for connection to an on-board multiplexed network of communication by multi-mode optical fibers for an aircraft, the device comprising a first optical component for modifying the spatial profile of a light beam, comprising a multi-mode optical input terminal configured to be connected to a first multi-mode optical fiber and single-mode optical output terminals, and a second optical component for modifying the spatial profile of a light beam, comprising single-mode optical input terminals and a multi-mode optical output terminal configured to be connected to a second multi-mode optical fiber. It further comprises an optical harness for switching and reassigning a transmission channel including single-mode optical inputs coupled to the single-mode optical output terminals of the first component,
(Continued)

single-mode optical outputs coupled to the single-mode optical input terminals of the second optical component, and single-mode waveguides.

6 Claims, 5 Drawing Sheets

(56) References Cited

U.S. PATENT DOCUMENTS

| | | | | |
|---|---|---|---|---|
| 2012/0207470 | A1* | 8/2012 | Djordjevic ............. | H04B 10/25 398/44 |
| 2020/0409141 | A1* | 12/2020 | Pinel .................... | G02B 6/2848 |

OTHER PUBLICATIONS

International Search Report for International Application No. PCT/FR2022/052080 issued Mar. 28, 2023 (4 pages).

* cited by examiner

[Fig.1]
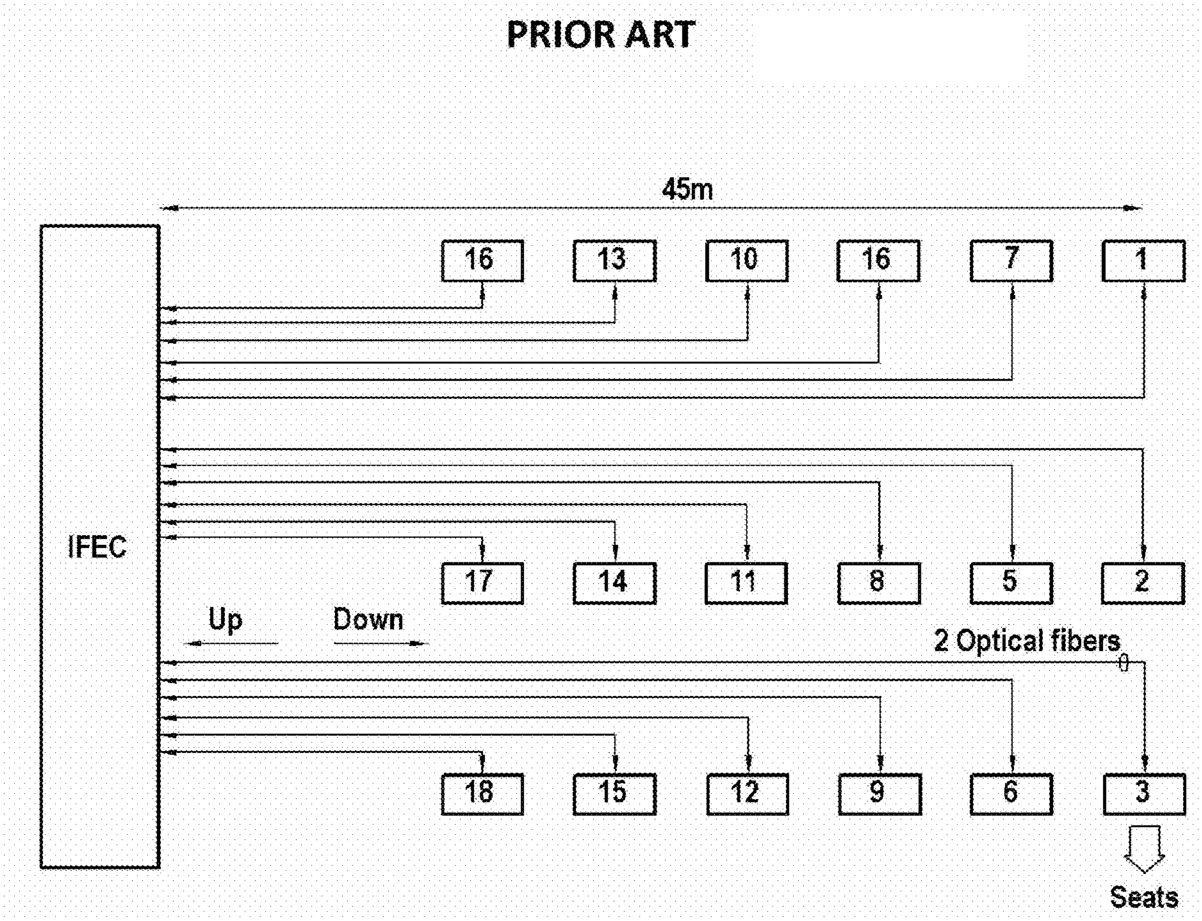

[Fig.2]
PRIOR ART
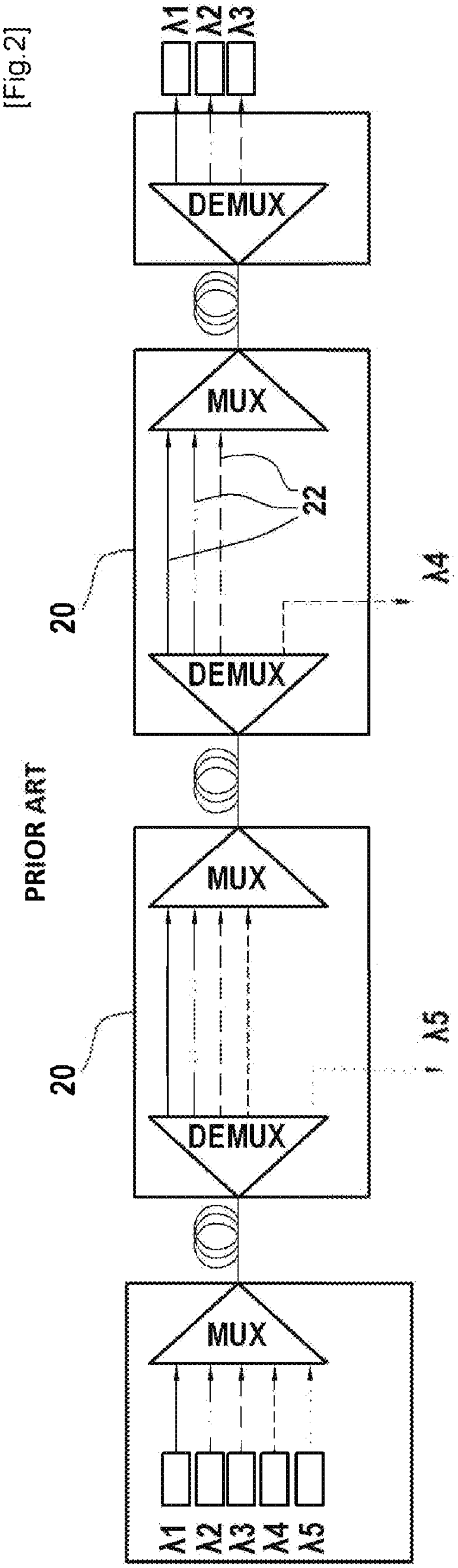

[Fig.3]
PRIOR ART
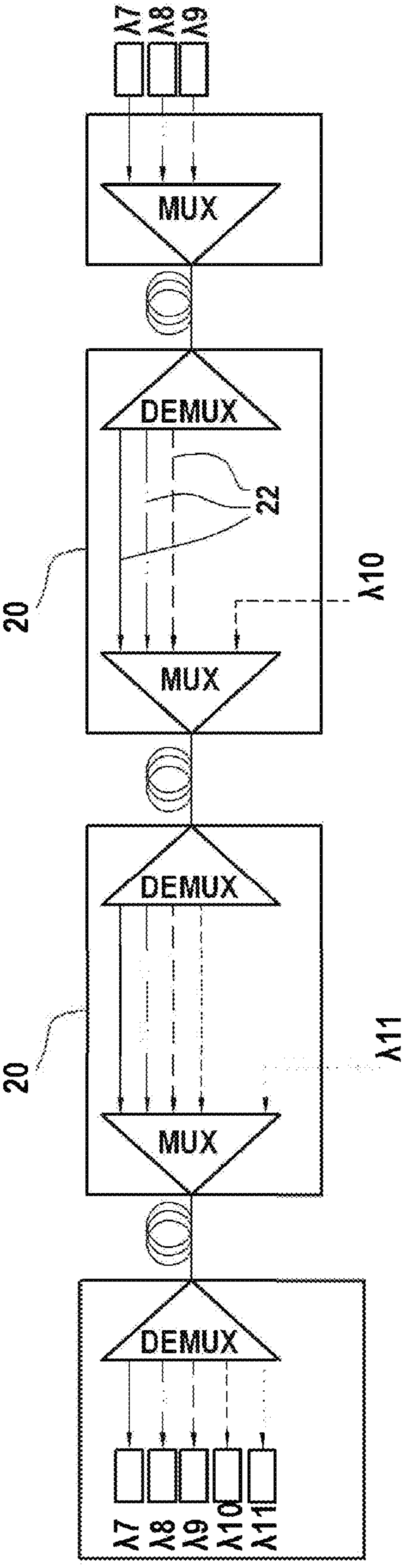

[Fig.4]
PRIOR ART
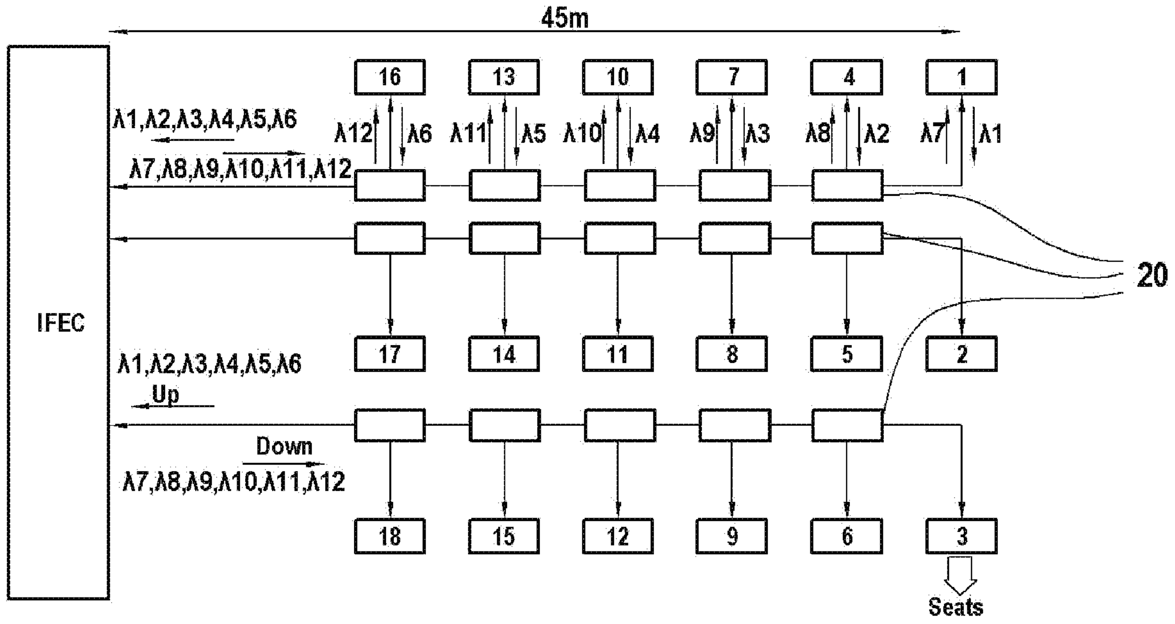

[Fig.5]
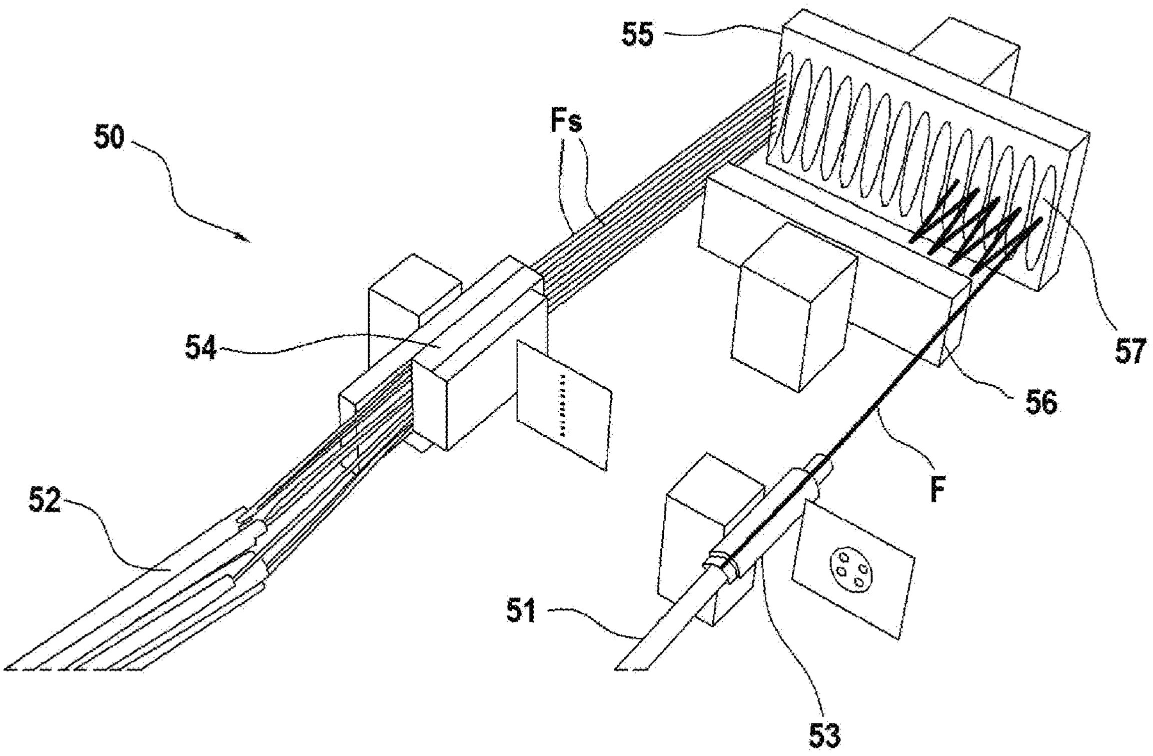
[Fig.6]
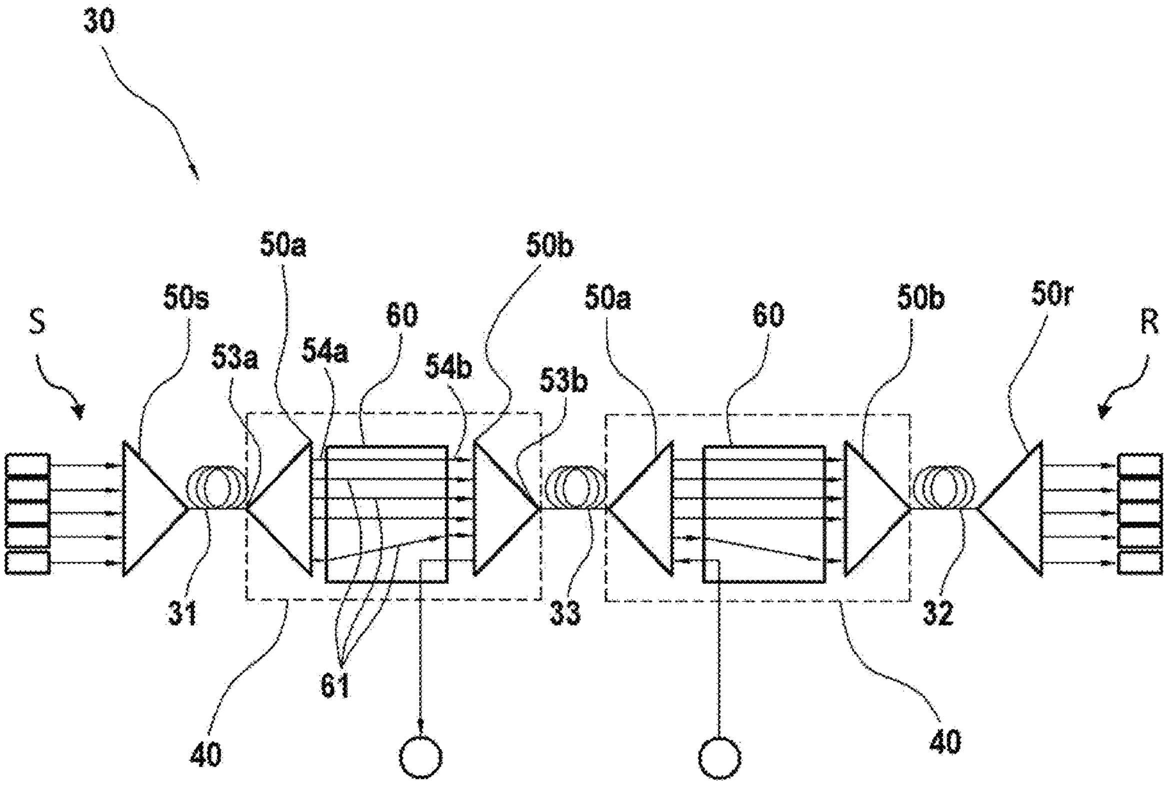

DEVICE FOR CONNECTING, BY REALLOCATION OF TRANSMISSION CHANNELS, TO AN ON-BOARD PASSIVE FIBRE MULTIPLEXED COMMUNICATION NETWORK FOR AN AIRCRAFT

CROSS-REFERENCE TO RELATED APPLICATIONS

This is a National Stage Application under 35 U.S.C. § 371 of International Application No. PCT/FR2022/052080, filed Nov. 4, 2022, now published as WO 2023/079248 A1, which claims priority to French Patent Application No. 2111777, filed on Nov. 5, 2021, the entireties of which are incorporated herein by reference.

TECHNICAL FIELD

The invention relates to the general field of on-board optical networks for transmitting multiplexed data in aeronautics or aerospace.

PRIOR ART

In order to connect together pieces of equipment of an aircraft for communication purposes, the aircrafts are equipped with different wirings forming one or several networks whose installation and maintenance can be complex. Furthermore, this wiring has a significant cost, on the one hand in terms of price of the cables but also in terms of weight leading to an increase in fuel consumption during the flight. The data transport cables generally use a copper support of two twisted pairs. This type of network with copper cables has several drawbacks: the metal cables pose electromagnetic disturbance problems (electromagnetic compatibility, current induction, etc.), the cable limits the throughput of the network), and the weight of the cables is high (approximately 32 kg/km, an airplane being able to comprise for example several hundred kilometers of cables). In addition to all these drawbacks, there is a high cost during modifications in a maintenance context.

A proposed solution to at least some of these drawbacks has been to replace the copper cables with optical fibers.

Optical networks onboard aeronautical or aerospace vehicles are essentially dedicated to data transmission. The first of them through its size is the In Flight Entertainment or IFE. It is present on a large number of recent aeronautical programs and provides the passengers with software and contents intended for their in flight entertainment via various pieces of equipment.

These networks are increasingly using the optical fiber given the ever-increasing linear throughputs and in particular due to the appearance of numerous new services and connected pieces of equipment. However, the architecture and the conventional technology of the wiring system of optical fibers within the aircraft are hardly compatible with its growing needs: mass, not very scalable, hardly reconfigurable wiring system.

Thus, for example, for the IFE of an Airbus A350 represented partly in FIG. 1, two types of equipment exchange data optically in this cabin zone: the Floor Disconnect Boxes or FDB, referenced 1 to 18, and the In Flight Entertainment Computer or IFEC. There are 18 FDBs. They are distributed as near as possible to a group of 20 passengers and, individually, they perform the function of distributor/collector of their data. The IFEC centralizes the IFE function and contains all the digital contents (videos, games, music, etc.) dedicated to entertainment.

The twenty optical links, whose maximum lengths reach a maximum length of 45 meters, are doubled, as illustrated in FIG. 1, in order to achieve a bidirectional exchange (IFEC to FDB and FDB to IFEC) and the number of links in presence is thus brought to approximately forty.

The links dedicated to sending data from the In Flight Entertainment Computer IFEC to the Floor Disconnect Boxes FDB ensure the downlink part (also called the "down") at 5 Mbps/seat, namely 100 Mbps for 20 passengers served for a FDB. The other links, that is to say the links dedicated to sending data by the Floor Disconnect Boxes FDB to the In Flight Entertainment Computer IFEC, are dedicated to the rising part (the "up") at 1 Mbps/seat.

Ultimately, the IFE network onboard the A350 is similar to a star network.

However, this situation is not fixed. Whether it is bidirectional transmissions, alternative topologies, such as a ring-multiplexed topology described in document FR 3 060 248, a lot of improvement work is currently being conducted.

One of the investigations conducted to improve optical architectures is the Coarse Wavelength Division Multiplexing or CWDM, mainly used in terrestrial technologies but not yet widespread in the aeronautical industry. The MUX/DEMUX modules ensuring the Coarse Wavelength Division Multiplexing/Demultiplexing functions are known among the key components.

The terrestrial CWDM allows the implementation of up to a number (ncwDM) of 16 different transmission channels. These transmission channels are the following infrared wavelengths: 1310, 1330, 1350, 1370, 1390, 1410, 1430, 1450, 1470, 1490, 1510, 1530, 1550, 1570, 1590 and 1610 nm. Their spacing of 20 nm guarantees non-overlap of the spectral lines whatever the ambient temperatures.

FIG. 2 and FIG. 3 represent an example of transmission on a single CWDM multiplexed optical line at ten wavelengths $\lambda$. All wavelengths are different and referenced from $\lambda_1$ to $\lambda_{10}$. The optical line operates in point-to-point and bidirectional mode (up and down). The up and down are represented separately (down in FIG. 2 and up in FIG. 3) for greater visibility but the bricks and the line are the same. By brick, it is meant an optical multiplexer, denoted MUX in FIGS. 2 and 3, or an optical demultiplexer, denoted DEMUX in FIGS. 2 and 3.

Two intermediate access points that will be called "nodes" are represented. Each node 20 comprises an optical multiplexing module MUX and an optical demultiplexing module DEMUX allowing access to the data transmitted on the line in order to inject (add) or extract (drop) them simultaneously. The optical multiplexer MUX and the optical demultiplexer DEMUX of the same node are coupled together via single-mode optical fibers 22 coupled between the single-mode inputs of one and the single-mode outputs of the other.

If only for the IFE in the cabin zone, it is possible to guess, compared to conventional fiber architecture, the numerous advantages that this CWDM technology could provide in an on-board network: the mass gain, the unusable bandwidth gain.

The multiplexing on a single optical fiber is per se a mass gain, but it is however necessary to take into account the connectivity used as well as the mass of the network connection nodes. Furthermore, the modules used are passive, they do not require any power supply. Finally, no software is needed. In addition, the MUX/DEMUX components are insensitive to electromagnetic disturbances. They can also be used in both directions and therefore the bidirectional aspect is entirely achievable.

Ultimately, the IFE architecture could be arranged in the way illustrated in FIG. 4. But such architecture has a certain number of drawbacks. The CWDM in particular has intrinsic limits, on the one hand, related to two physical principles and, on the other hand, related to the specific case of the reconfiguration.

The Coarse Wavelength Division Multiplexing or CWDM is limited by two physical principles.

The first principle is the wave aspect of light. Any beam can be compared to a wave as long as its spectral line is narrow (a few nanometers wide). However, if the beam is put in the presence of a second beam of identical nature (similar strength and identical wavelength $\lambda_0$) but in phase opposition, then there will be destructive interference. As the beams recombine, they will disappear totally or partly and the information conveyed with them will also disappear.

It is therefore not possible to have two signals coexist within the same optical fiber as long as they have the same transmission characteristics.

Thus, because the CWDM allows up to 16 wavelengths and given this wave principle of light, this number is reduced by half for a bidirectional use. Eight of the available wavelengths can be used for the "up", and the other eight for the "down". Ultimately the number of usable subscribers on the optical line is very small.

The second limiting physical principle is the conservation of energy. A speck of light (the photon) has an energy E inversely related to the wavelength $\lambda$: $E=hc/\lambda$, with h the Planck constant and c the speed of light. However, there is no device that is both optical and passive making it possible to obtain, from this first speck of light alone, a second speck of light of higher energy (and therefore of shorter wavelength).

Consequently, it is appropriate to accumulate the energy of several incident photons to ultimately harvest a final one of higher energy. This is certainly achievable (up-conversion phenomenon or anti-stokes), but these energy exchanges, firstly fall within the laboratory experience (there is no product off-the-shelf), secondly depend on the (rare) conversion media allowing this up-conversion, which involves using and obtaining "exotic" wavelengths and thirdly degrade the characteristics of the original signal (power).

In the aviation sector, the passive CWDM wavelength conversions (without the provision of electrical energy coming from an external network) are therefore not possible.

The following two major limitations of use in CWDM result from these two physical principles. Firstly, the same signal, after duplication, can only be issued on two different CWDM transmission channels. Secondly, two different signals but having identical optical characteristics cannot be multiplexed simultaneously.

The two limitations relating to the physical principles and mentioned just before are problematic in the case of a modification of the arrangement of the subscribers on the CWDM multiplexed network that is to say in the case of a reconfiguration of the network.

If the simple addition of a subscriber configured to emit at a wavelength, $\lambda_{10}$ for example, on the first node, is considered in a CWDM multiplexed network, the risk of destructive recombination makes the envisaged reconfiguration impossible.

The Modification of this CWDM network by the addition of this new subscriber is only achievable using the two following options.

A first option consists in modifying the new emitters and receiver systems accordingly, and more specifically their spectral characteristics in transmission (TX) and reception (RX) to bring the new signal to an unusual wavelength. However, the number of CWDM wavelengths is limited.

If this is possible in terrestrial technologies by simple change of telecommunications transmitter, it is not possible for a system onboard an aircraft in flight. Indeed, modifying the emission/reception components of an on-board system dedicated to data transmission has serious consequences. Each subscriber is the result of a long development conducted beforehand that is to say even before the definition of the network topology. Returning to the intrinsic emission/reception characteristics of the systems amounts to imposing major modifications on them and potentially reconsidering their certification.

This first scenario, called "modifications of the systems", is synonymous with an excessive increase in the recurring costs or RC.

A second option consists in adding two optical/electronic and electronic/optical conversion modules, in series, in order to obtain the desired transmission channel, in other words in this case of the CWDM, the desired wavelength.

This second scenario called "conversion modules" scenario is similar to what is done with Reconfigurable Optical Add Drop Multiplexer or ROADM, available in the field of telecommunications. It has the advantage of not modifying the embedded systems as in the previous scenario. Indeed, the conversion modules can be considered as part of the transmission media: the cable and its nodes.

However, this approach completely erases the initial gains offered by the CWDM multiplexing that is to say the passivity, simplicity and mass gain.

Indeed, these optical/electronic and electronic/optical conversion modules have a significant mass which must be weighed against the mass gains of the CWDM multiplexed network alone.

Furthermore, these conversion modules must be powered, and are therefore not passive. Therefore, the general topology is heavily impacted since a power supply network must be installed in parallel with the first one (the multiplexed fiber cable).

Finally, these modules, for their electronic component, must host specific software for protocol management. In addition, they must meet possible broadband expectations while being insensitive to electromagnetic disturbances. In addition to the fact that this conversion causes latency, the electronics require dedicated shielding, as well as hardened components, and other constraining elements.

A fiber network in an aircraft must be as adaptable and flexible as possible. A CWDM architecture turns out to be limited in number of channels and difficult to reconfigure with any reconfiguration of the network.

It would be appropriate to develop a new technological approach to respond to any reconfiguration request, while ensuring the aspects of passivity, simplicity and mass gain which are partially lacking in CWDM multiplexing.

DISCLOSURE OF THE INVENTION

The invention aims to provide a solution for benefiting from a mass gain, a simplification and a passivity of the on-board multiplexed network while overcoming all the constraints mentioned above in the event of reconfiguration of the network.

One object of the invention proposes a device for connection to an on-board multiplexed network of communication by multi-mode optical fibers, intended to be mounted onboard an aircraft, the device comprising a first optical component for modifying the spatial profile of a light beam, comprising a multi-mode optical input terminal configured to be connected to a first multi-mode optical fiber and single-mode optical output terminals, and a second optical component for modifying the spatial profile of a light beam, comprising single-mode optical input terminals and a multi-mode optical output terminal configured to be connected to a second multi-mode optical fiber.

According to a general characteristic of the invention, the connection device further comprises an optical harness for switching and reassigning a transmission channel including single-mode optical inputs coupled to the single-mode optical output terminals of the first component, single-mode optical outputs coupled to the single-mode optical input terminals of the second optical component, and a plurality of single-mode waveguides connected at a first end to an input of the optical harness and/or at a second end to an output of the optical harness.

Unlike the single-mode fibers which have a very small core diameter and which propagate light in a single mode which is the fundamental mode, the multi-mode fibers have a larger core diameter and can propagate light simultaneously in several propagation modes. The propagation modes excited in the fiber are characterized by spatial profiles of electric field phase and strength in a plane transverse to the axis of propagation. These profiles are different depending on the modes and several modes can coexist. The multi-mode fibers are advantageous because they can transmit more energy than a single-mode fiber when the beam applied to the input has several modes. A single-mode fiber would simply eliminate the energy brought in the modes other than the fundamental mode.

The optical components for modifying the spatial profile of a light beam are passive optical components making it possible to perform Spatial Division Multiplexing or SDM, thanks to the of Multi-Plane Light Converter or MPLC technology. The SDM involves a transmission channel called modal or spatial transmission channel, different from the transmission channels used in the other optical multiplexing technologies.

The MPLC technology provides a simple and effective way to model the transverse profile of any single-mode Gaussian coherent beam. This modeling, reproduced simultaneously for n different input beams, makes it possible to assign to each of them the shape of a propagation mode of the multi-mode network fiber. All of the beams are then added in the different modal shapes in the multi-mode optical fiber and transmitted in end of line without interference to the second MPLC demultiplexing module, that is to say to the second optical component for modifying the spatial profile of a light beam.

The Spatial Division Multiplexing is compatible with the Coarse Wavelength Division Multiplexing which means that per mode, it is possible to use several wavelengths. Ultimately, signals emitted with identical characteristics could be transmitted within the same multi-mode fiber as long as the modes are different. It is therefore possible to make two different signals but with identical transmission characteristics coexist within the same optical fiber, on different modes.

Thus, for example, considering 12 different propagation modes and 5 wavelengths, the total number of channels usable by a single multi-mode optical fiber is 12×5=60 channels. Bidirectionally, there are therefore 30 channels that can be used per direction of propagation.

In addition, the use of the propagation modes as a transmission channel makes it possible to overcome energy and wavelength considerations. Thus, the fact of using the modal transmission channels allows overcoming the spectral conversion limitation mentioned above. For a given optical signal, the SDM therefore makes it possible to simply and efficiently re-allocate the transmission channel from one mode to another, whatever they may be.

The SDM implemented by these optical components thus provides a solution for increasing tenfold the data transport capacities onboard the aircrafts to meet the growing needs for on-board data exchanges, while offering a strong ability to reconfigure the wiring system throughout the lifetime of the airplane.

The Spatial Division Multiplexing does not suffer from the problems encountered with the Coarse Wavelength Division Multiplexing, in particular related to the installation of a secondary power supply network to offer the possibility of reconfiguring the network following the removal or addition of subscribers.

Indeed, the optical harness for switching and reassigning transmission channels offers the possibility of modifying the configuration of the optical network each time it is necessary by removing or adding a subscriber or by modifying optical links to thus reassign an optical signal on a new modal transmission channel. The optical harness forms an optical connection interface between two optical components for modifying the spatial profile of a light beam.

Furthermore, by the number of channels offered, the simplicity of use and especially the flexibility of use that the connection device provides thanks to the technological possibility of changing the modal transmission channel, the multiplexed network with Spatial Division Multiplexing using such connection device is better than a CWDM network, while maintaining a passive nature of the elements used and an at least equivalent efficiency and achieving a mass gain thanks to the absence of heavy additional devices.

Indeed, the connection device does not use any additional electronic or supply devices that could add weight, or any software. It only uses waveguides whose mass is as small as possible.

The connection device is bidirectional and supports the existing multiplexed technologies without the use of any software and while offering an increased number of usable channels compared to known technologies because the Spatial Division Multiplexing encompasses the multiplexing. The number of channels offered in SDM corresponds to the result of the product between the number of modes and the number of wavelengths available.

In one embodiment, each of the first and second optical components for modifying the spatial profile can include a first input/output of a multi-mode light beam, a second beam input/output, at least two mirrors allowing multiple reflection of the beam between the two mirrors, and an optical phase shift structure mounted on one of the two mirrors and which includes several sets of multiple elementary phase shifting zones, the individual phase shifting patterns introduced by the elementary phase shifting zones in each set generating an intermediate transformation of the spatial profile of the beam following the passage of the beam through this set, and the intermediate transformations generated by several sets combining, during the passages of the beam over the phase shift structure during multiple reflections between the mirrors, to form an overall transformation which includes a transformation of a first propagation mode or mode group present in the input light beam into a second output propagation mode or mode group, and reciprocally a transformation of the second mode or mode group present in the input light beam into the first output mode or mode group.

According to a practical case of the connection device, the single-mode waveguides of the optical harness are made of silica.

According to another practical case of the connection device, the optical harness can be removable from the connection device to be replaced, for example during ground maintenance operations, by another optical harness of a possibly different configuration.

Another object of the invention proposes an on-board optical communication network adapted to allow data transmission by multi-mode optical fiber between pieces of equipment of an aircraft, the network comprising an upstream multi-mode optical fiber intended to be coupled to a source of a light radiation digitally modulated by the information and a downstream multi-mode optical fiber intended to be coupled to a receiver making it possible to demodulate this information, characterized in that it comprises at least one connection device as defined above and connected between the upstream optical fiber and the downstream optical fiber.

Another object of the invention proposes an aircraft comprising at least one on-board optical communication network as defined above.

BRIEF DESCRIPTION OF THE DRAWINGS

The invention will be better understood upon reading the following, as indication but without limitation, with reference to the appended drawings in which:

FIG. 1, already described, schematically presents a data distribution network known from the prior art.

FIG. 2, already described, schematically illustrates an example of transmission in a first direction on a Coarse Wavelength Division Multiplexed optical line of the prior art.

FIG. 3, already described, schematically illustrates an example of transmission in a second direction opposite to the first direction, on a Coarse Wavelength Division Multiplexed optical line of the prior art.

FIG. 4, already described, schematically presents a hypothetical Wavelength Division Multiplexed optical network according to the prior art.

FIG. 5 schematically represents an optical component for modifying the spatial profile of a light beam according to one embodiment of the invention, FIG. 6 schematically represents an optical communication network comprising a connection device according to one embodiment of the invention.

DESCRIPTION OF THE EMBODIMENTS

The spatial profile of a light beam is a distribution profile of the electric field in a light beam section transverse to the axis of propagation. It is a profile of complex amplitudes of an electric field which can be represented at all points of the section by a strength y and a phase. For example, the strength profile would be a Gaussian in the case of a beam transmitted by a single-mode fiber excited according to the fundamental mode. The profile is obviously more complex in the case of a multi-mode beam and it can be broken down into specific profiles corresponding to each mode.

The propagation modes in a multi-mode fiber are commonly listed in the literature and often designated by letters and numbers that indicate the nature of the mode and its order along two dimensions. Typically, the first-order mode or fundamental mode is commonly referred to as LP01, the higher modes are the LP11a, LP11b, LP21a, LP11b, LP02, LP03, LP31a, LP31b modes, etc.

Any beam propagating in a multi-mode fiber can be broken down based on the LP modes. The technical literature abundantly gives the shapes of these spatial profiles for the most common modes. The most rapidly propagating mode is the fundamental LP01 mode. The other modes propagate more slowly, first the LP11 mode, then the LP02 and LP21 modes, and then the other modes. It is for example possible to choose to divide these modes into a first group comprising only the LP01 mode and a second group comprising the LP11, LP02 and LP21 modes. Or it is possible to divide the two modes into a first group comprising the LP01 mode and the LP11 mode and a second group comprising the LP02 and LP21 modes. A division of the modes of the fiber into more than two groups is possible.

In the article by Jean-François Morizur and others, "Programmable 10 unitary spatial mode manipulation" in the Journal of Optical Society of America Vol. 27, No 11, November 2010, it is shown that it is possible to transform the spatial profiles of a family of light beams into any other family of spatial profiles, provided that the transformation thus defined conserves energy, by a succession of intermediate transformations in free (unguided) space each using a matrix of phase shifting elements acting on the section of the light beam which illuminates this matrix. In this article, the phase shifting elements are programmable and constituted by electrically actuatable deformable mirrors but the principle would be the same with a non-programmable mirror plate structured with a fixed configuration for a predefined transformation. It would also be the same with a programmable (liquid crystals) or non-programmable transparent plate, structured to introduce a phase shift matrix on the path of the light beam.

This article also shows how any unitary transformation (which conserves energy) of the spatial beam profile can be obtained exactly by using a finite number of intermediate transformations obtained by an alternation of phase shifting structures and optical Fourier transformations. If a limit (for example around ten) is imposed on the number of intermediate transformations, the overall transformation obtained will be more approximate. The phase shifting structures modify the phases in the section of the light beam point by point. The optical Fourier transforms can be spherical lenses or mirrors, but in practice a simple propagation of the beam over a few centimeters in free space between two phase shifting structures can replace the optical Fourier transforms in the alternation.

The previous article gives a recipe for the design of optical systems based on a succession of phase shifting structures and free propagation between these structures to perform any unitary transformation of the spatial profile of a coherent light beam.

Another design recipe for the different sets of phase shifting structures making it possible to make a desired transformation has been described in the patent publication WO 2012/085046, either to correct a beam that has undergone a profile transformation or to voluntarily apply a desired profile transformation to a beam. This design of the different phase shifting structures, which is faster, more efficient but less general than that of the previous article, is done in practice by simulation in a computer capable of modeling the behavior of the beam profiles in a succession of different optical elements and in particular of the phase shifting structures and free propagation spaces. The computer simulates the passage, through this succession of optical elements, of a light beam having an input profile and it calculates the resulting output beam. It then causes this output beam to interfere with a beam having a desired spatial profile on the plane corresponding to a phase shifting structure. The result of the interferences on the plane corresponding to each phase shifting structure is observed and the configuration of the structure is modified in a direction tending to maximize the interferences. This operation is repeated on the successive phase shifting structures and we start again with successive iterations on all the structures until obtaining an output beam with a profile very close to the desired beam. The final configuration of the phase shifting structures obtained after these iterations is then used to constitute the optical component for modifying the spatial profile which transforms the first profile into a second desired profile, whatever it may be.

Transformations consisting of a multiplexing of several propagation modes, that is to say a transformation of the spatial profile of several simple modes into a complex mode combining the spatial profiles of the simple modes, have been proposed in the article by Guillaume Labroille and others, "Efficient and mode-selective spatial mode multiplexer based on multi-plane light conversion", in Optics Express 30 Jun. 2014 Vol. 22 No 13 p. 15599.

The component that performs this transformation also allows performing the inverse transformation (demultiplexing). Rather than using a succession of phase shifting structures separated by free propagation spaces, it uses multiple reflection of the beam between two mirrors and a passage of the beam each time through the same phase shifting structure but in portions different therefrom, each portion representing the equivalent of a particular phase shifting structure.

The optical component used in the present invention is a spatial profile transformation component made according to the principles just described. It executes a transformation of the spatial profiles corresponding to several propagation modes or mode groups, each profile being transformed into another profile, in particular to transform the single-mode signals into a multi-mode signal or conversely.

To explain the operation of the optical component for modifying the spatial profile, a simplified example of a way of carrying out the invention in the case where the input beam only include two modes LP01 (fast) and LP11a (slow) can be given. Such an example beam may have been obtained by prior filtering eliminating all the other modes. We are therefore looking for the succession of phase deformations that will make it possible to simultaneously transform in the optical component the profile of the light entering the LP01 mode towards the LP11a mode and the profile of the light entering the LP11a mode towards the LP01 mode. To find the relevant succession of deformations, it is possible to use the iterative method described above or the method described in the aforementioned article by J F Morizur. The LP01 mode carrying information which was slightly in advance due to the propagation, in the input fiber(s), of the optical component has become an LP11a mode carrying this information in advance and reciprocally the LP11a mode carrying slightly delayed information has become a faster LP01 mode but carrying delayed information. In the propagation in the output fiber(s), the LP11a mode will lose the lead it had taken at the input and the LP01 mode will catch up the delay it had taken. If the fibers are identical, they should be preferably given identical lengths. If they are not identical, that is to say if they do not give the same propagation delay differences, it is necessary to calculate the optimal position of the component to place it where the delay differences due to the input fiber are equal to the delay differences due to the output fiber.

FIG. 5 schematically illustrates an example of architecture of an optical component 50 for modifying the spatial optical profile of a light beam according to one embodiment of the invention.

The optical component 50 comprises a first multi-mode terminal 53 to which is connected a multi-mode optical fiber 51 which provides a beam F modulated in amplitude by digital information, second single-mode terminals 54 to which are connected single-mode optical fibers 52, a pair of mirrors 55 and 56, and a structure 57 of optical phase shifting of the beam. The first terminal and the second terminals are preferably systems including lenses.

In a first direction of use of the optical component 50, the beam F is delivered as input to the first multi-mode terminal 53 of the optical component 50 by the multi-mode optical fiber 51. The beam F is then directed onto a pair of mirrors 55, 56, optionally passing through optical elements such as lenses, reflective mirrors, semi-transparent mirrors. The optical phase shifting structure 57 is made on the reflective surface of the first mirror 55, and the pair of mirrors 55 and 56 ensures the multiple reflections of the beam.

The optical phase shifting structure 57 is formed on the reflective surface of the first mirror 55. Indeed, the first mirror 55 comprises, on the scale of the wavelength of the radiation, a reflective surface having a relief whose hollows and bumps define by their heights and depths the relative phase shifts to be applied to the beam parts that strike these hollows and bumps. These heights and depths relative to an average plane are of the order of the wavelength of the light beam, ranging from a fraction of a wavelength to a few wavelengths. A use wavelength could be 1,550 nm.

The first mirror 55 thus plays here not only the role of a mirror to ensure multiple paths of the beam but also the role of a structure of optical phase shifting of the beam. The multimodal beam is thus transformed, over the successive phase shifts, into a set of single-mode light beams at the output of the mirror pair 55 and 56. The light beams Fs are directed at the output towards the second single-mode terminals 54 before being each added into a single-mode optical fiber 52.

The optical component 50 operates in both directions. In the opposite direction, the first multi-mode terminal 53 is an output terminal and the second terminals 54 are input terminals.

FIG. 6 schematically represents a multiplexed optical data communication network 30 according to one embodiment of the invention.

The optical network 30 comprises an optical source S digitally modulated by information to be transmitted and an optical receiver R making it possible to decode the transmitted digital information. In the simplified example illustrated in FIG. 6, the optical network 30 further comprises two connection devices 40 connected in series between the source S and the receiver R.

The source S is connected to a first connection device 40 via an optical component 50*s* for modifying the spatial profile and a first multi-mode optical fiber 31, and the receiver is connected to a second connection device 40 via an optical component 50*r* for modifying the spatial profile via a second multi-mode optical fiber 32. And the first connection device 40 is coupled to the second connection device 40 via a third multi-mode optical fiber 33.

Each connection device 40 comprises a first optical component 50*a* configured to be connected to a multi-mode optical fiber on its multi-mode input terminal 53*a* and deliver single-mode light beams on its single-mode output terminals 54*a*, a second optical component 50*b* configured to receive single-mode optical beams on its single-mode inputs 54*b* and be connected to a multi-mode optical fiber on its multi-mode output 53*b*, and an optical harness 60 for switching and reassigning the transmission channel coupled between the single-mode output terminals 54*a* of the first optical component 50*a* and the single-mode input terminals 54*b* of the second optical component 50*b*.

The optical harness 60 comprises a plurality of single-mode optical fibers 61 made of silica in the case of SDM, and one or several terminals for fibers, also called connectors, to allow the replacement of the harness. The harness 60 can comprise different coupling configurations between its input and output connectors, these couplings can comprise couplings to additional inputs to allow the connection to a new optical fiber thus allowing the connection of a new subscriber to the optical network, or conversely, a lack of coupling of an input to one of the outputs, or conversely.

Depending on the desired architecture and therefore following the desired configuration, the optical harness 60 ensures the routing of the different optical signals on the transmission channels available among the multi-mode fibers 31 of the optical network 30. The routing is determined by the progress of the optical fibers used between the two optical components 50 which carry out the spatial profile modification. The optical fibers 61 are added according to the desired particular arrangement in the terminals 54.

The optical channel reassignment harness 60 can be presented in two different forms. For example, it could be considered as a single component because it is made up of secured and inseparable elements. The optical harness 60 fixed in a specific configuration is identified with a unique reference. In such a case, in the event of a search for a new routing solution, it is the entire harness with its connector(s) at the ends that should be replaced by another harness meeting the reconfigurability need.

In this configuration, the optical harness 60 in fixed configuration can thus be made with an MPO type multi-fiber harness meeting the IEC 61754-7 standard with high-density optical contacts. Indeed, after mounting of the contacts on the multi-fiber harness, it is not possible to modify the arrangement of the fibers.

Conversely, in another configuration, the optical harness 60 could be scalable and modifiable. To this end, the fibers are independent of each other and can be easily manipulated in order to be able to drop or add each of the contacts at their ends into the dedicated cavity of the terminal 54. Thus, the contacts in question could be of the type called snap or push-pull type. Mention can be made on the one hand to the contacts conventionally used in the aeronautical field such as the ELIO© (EN4531) or Luxcis© (ARING 801) contact which can for example be associated with MIL 38999 or EN4165 or ARINC600 type connectors, without forgetting on the other hand the conventional telecom contacts such as the Lucent Connector (LC) meeting the IEC 61754-20 standard and or the Switching Connector (SC) meeting the IEC 61754-4 standard.

The invention claimed is:

1. A device for connection to an on-board multiplexed network of communication by multi-mode optical fibers, intended to be mounted onboard an aircraft, the connection device comprising:

a first optical component for modifying the spatial profile of a light beam, comprising a multi-mode optical input terminal configured to be connected to a first multi-mode optical fiber and single-mode optical output terminals, and a second optical component for modifying the spatial profile of a light beam, comprising single-mode optical input terminals and a multi-mode optical output terminal configured to be connected to a second multi-mode optical fiber, wherein the connection device further comprises an optical harness for switching and reassigning a transmission channel including single-mode optical inputs coupled to the single-mode optical output terminals of the first component, single-mode optical outputs coupled to the single-mode optical input terminals of the second optical component, and a plurality of single-mode waveguides connected at a first end to an input of the optical harness and/or at a second end to an output of the optical harness, the first optical component for modifying the spatial profile of a light beam and the second optical component for modifying the spatial profile of a light beam being passive optical components configured to perform Spatial Division Multiplexing or Spatial Division Demultiplexing via Multi-Plane Light Converter.

2. The connection device according to claim 1, wherein the single-mode waveguides of the optical harness are made of silica.

3. The connection device according to claim 1, wherein the optical harness further comprises a control module and controlled optical switches configured to change their configuration depending on the command received from the control module, each controlled optical switch making it possible to modify the output to which the input associated with the controlled switch is optically connected.

4. The connection device according to claim 1, wherein the optical harness is removable from the connection device to be replaced at any time by another optical harness of a possibly different configuration.

5. An on-board optical communication network adapted to allow data transmission by multi-mode optical fiber between pieces of equipment of an aircraft, the network comprising an upstream multi-mode optical fiber intended to be coupled to a source of a light radiation digitally modulated by the information and a downstream multi-mode optical fiber intended to be coupled to a receiver making it possible to demodulate this information, wherein that it comprises at least one connection device according to claim 1 connected between the upstream optical fiber and the downstream optical fiber.

6. An aircraft comprising at least one on-board optical communication network according to claim 5.

* * * * *